C. S. HUNTINGTON.
Horse Rake.
No. 58,832.
Patented Oct. 16, 1866.
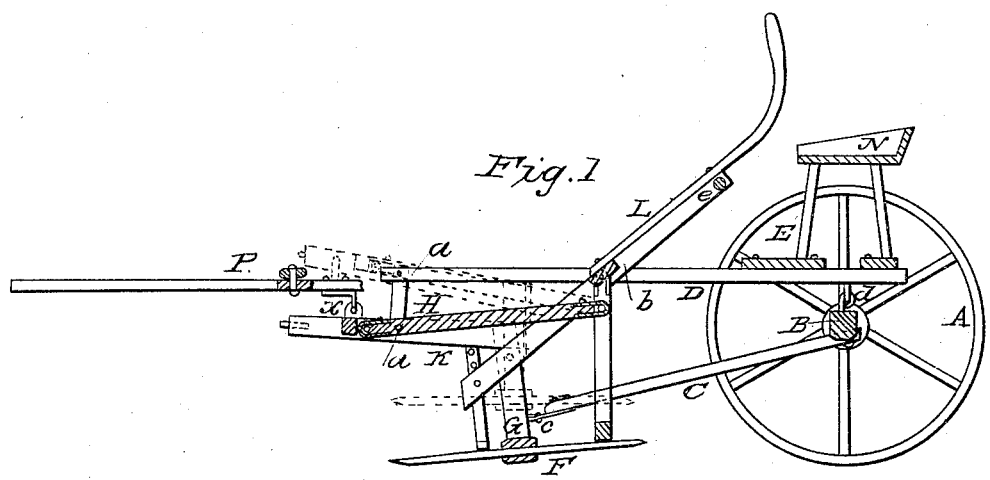
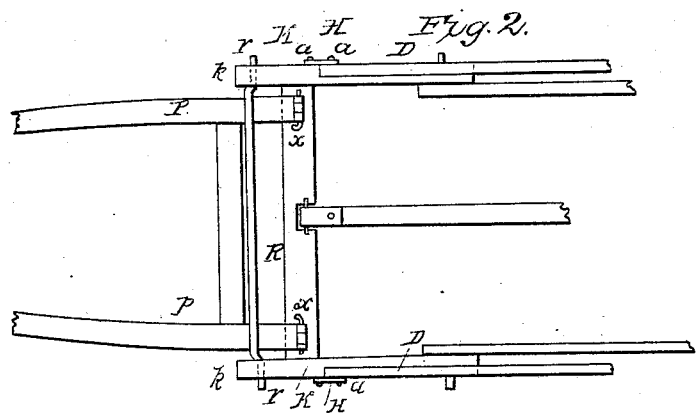
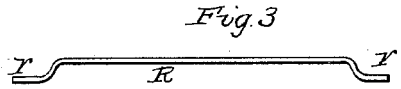
WITNESSES
Jos. L. Coombs
M. Bailey
INVENTOR
Charles S. Huntington
Per. A. Pollok Atty

UNITED STATES PATENT OFFICE.

CHARLES S. HUNTINGTON, OF BLACK RIVER, NEW YORK.

IMPROVEMENT IN HORSE-RAKES.

Specification forming part of Letters Patent No. 58,832, dated October 16, 1866.

*To all whom it may concern:*

Be it known that I, CHARLES S. HUNTINGTON, of Black River, in the county of Jefferson and State of New York, have invented certain new and useful Improvements in Horse-Rakes; and I hereby declare the following to be a full, clear, and exact description of the same, reference being had to the accompanying drawings, in which—

Figure 1 represents a central longitudinal vertical section of a rake to which my improvements are applied. Fig. 2 is a top view of the thills and forward part of the rake-frame, and Fig. 3 represents the cross-bar for raising the rake-frame from the ground.

My invention relates to that class of rakes known as "revolving rakes;" and its principal object is to combine with a rake of this kind a carriage or riding frame capable of being readily adjusted to or detached from the rake, so that such rake may be used either with or without the carriage or riding-frame at the pleasure of the operator.

To accomplish this object in the simplest and most efficacious manner I construct the carriage of the following parts, viz: first, the wheels A and the axle B upon which they revolve; second, the draft-bars or reaches C, by which the carriage is drawn; third, the platform-bars D and platform E for supporting the operator.

The draft-bars, placed one on each side of the carriage, are secured to the axle, being either rigidly connected therewith or having a loose joint, and are so arranged with respect to the rake that they shall effect the whole traction of the carriage. The two platform-bars are not intended for this purpose, their function being to sustain the platform and to keep it constantly in proper position; and to this end they are jointed or hinged, at a suitable distance apart, to the carriage-axle and rake-frame in such manner as to preserve in a great degree the level of the platform during the revolution of the rake-head F and consequent rising and falling of the rake-frame. The carriage thus constructed is placed in rear of a revolving rake of ordinary or suitable construction, and is secured thereto as shown in the drawings. The reaches C, extending out in front of the carriage with a slight downward inclination, so as to have a lifting-draft upon the rake when the machine is in motion, are secured at their outer ends to the main standards G, which support the rake and rake-frame. Their connection with the standards is maintained by hinge-joints c, which allow the rake-head and frame full liberty of motion, while at the same time they hold the draft-bars firmly to the rake. These hinge-joints are so arranged that the hinges may be removed or applied at pleasure, according as it is desired to connect or disconnect the carriage and rake. The draft-bars should preferably be rigidly secured to the axle at $c'$, as shown in the drawings, but they may also be loosely connected therewith, their rear ends being made of a tubular shape, so as to form sleeves or collars fitting on the axle B, which may be of cylindrical shape. The platform-bars D are secured to the axle by hinge-joints $d$, as shown in the drawings, or in any other suitable manner, so as to allow the bars to move freely and to maintain their level. The outer ends of the bars, which extend some distance above and in advance of the draft-bars, are supported and attached to the forward part, K, of the rake-frame by means of connecting strips or links H, of suitable length, pivoted by bolts or pins $a$, at their upper ends, to the platform-bars, and at their lower ends to the rake-frame. The links are so arranged that when the rake is in its normal position (as shown in black lines in Fig. 1) they shall have a perpendicular position, thus holding the rake-frame and the platform-bars at the farthest distance from each other and allowing the greatest space for the vertical movement of the frame without throwing the platform-bars from their level.

It will be readily seen that under this arrangement the upward movement of the rake-frame when the rake-head F is revolved cannot affect in any great degree the platform E, which is constantly maintained in a horizontal position, and the operator is thus enabled to stand or sit securely upon the platform while the machine is in motion and working.

The bolts or pins $a$, by which the links H are pivoted to the platform-bars and rake-frame, are, like the hinge-joints $c$ of the reaches C, capable of being removed, so as to detach the bars D from the frame K. The reaches C and platform-bars D are of such length that the carriage is held at a sufficient distance in rear of the rake to allow the latter to operate freely and without interference. The platform E is also so constructed as to leave sufficient space between the two platform-bars for the necessary vibratory movement of the handle-frame of the rake.

In order to enable the raker, when standing on the platform, to lock or unlock the rake-head without difficulty, a lever-handle, L, is secured by a screw or bolt to the cross-piece $b$, which supports the main stop M of the rake, and extends back therefrom, being also fastened to the rear rail, $e$, of the handle-frame, until its rear end has reached a position where the operator can lay hold of it without difficulty.

The handle of the lever is bent or turned up, so that it may be used with greater ease.

When the machine is in motion and the operator desires to discharge the hay from the rake, the lever L is pressed forward and upward, so as to vibrate the handle-frame and thus remove the main stop from the back tines of the rake. As soon as this is done the rake-head F revolves, discharging the hay which has gathered on the front tines, and the stop M having in the mean time been brought back into position by drawing back the lever L, the rake having completed its revolution, is again locked and held in position by the stop M and springs $m$ or other ordinary locking device.

From the foregoing it will be seen that there are only four points of connection between the rake and carriage, viz., the hinge-joints $c\,c$ and connecting-links H H, and that these joints or hinges are so arranged that they may be taken apart, if desired.

Many advantages result from this arrangement. The rake may be used either with or without the carriage, according as is required by the nature of the work to be performed or of the ground to be raked. The carriage may also be used with any revolving rake of ordinary construction similar to that herein shown, the only requisite to its complete combination with such rake being the hinged connection of the draft-bars and platform-bars with the rake standards and frame, as above described.

Important advantages arise from the relative position to each other of the rake and carriage, the rake and its frame being wholly in front of the carriage and platform or seat N occupied by the raker, for the operator, while guiding and directing the horse, can at all times see what kind of raking is being done, whether there are any obstacles in the path, when the windrows are of the proper size, &c., the whole machine, in fact, being under his eye.

In order to prevent the rake from dragging on the ground, and to obviate the necessity of unshipping it when taken to and from the field, I make use of the arrangement shown in Figs. 2 and 3, by means of which the rake may be lifted entirely from the ground when necessary, the rake and frame being in this case suspended between the axle of the carriage, and the shafts or thills P hinged at $x$ to the rake-frame. The rake-frame and rake being raised up by the front end, $k$, of the side bars, K, which extend out on each side of the thills beyond the point where they are hinged at $x$ to the front of the rake-frame, the said front ends will, when lifted to a proper height, be considerably above the level of the thills, so that a cross-bar, R, of suitable length, when placed across the thills just behind the whiffle-tree $p$, Figs. 1 and 3, will catch under the ends $k$, and will thus hold the rake and frame a sufficient distance above the ground, as indicated in red lines in Fig. 1.

The cross-bar R may be either a straight piece of wood or metal or bent at its ends $r\,r$, Fig. 3, where it catches under the side bars, K. This cross-bar can be readily removed from its position in the machine when it is required to drop the rake to the ground.

Having thus described my invention, what I claim, and desire to secure by Letters Patent, is as follows:

1. As a carriage or riding attachment for revolving rakes, the detachable carriage herein described, the same being composed of, first, the wheels and the axle upon which they revolve; second, the reaches or draft-bars by which the carriage is drawn; third, the platform-bars, arranged so as to maintain a horizontal position during the rising and falling of the reaches and rake-frame.

2. Attaching the reaches and the platform-bars of a rake-carriage, as described, to the frame of a revolving rake by hinge and link connections, or the equivalents thereof, in such manner that, while the rake-frame is free to vibrate and the rake-head to revolve, the platform-bars shall maintain their level during such vibration and revolution, substantially as described.

3. In combination with the thills and side bars, K, of the rake-frame, the cross-bar R, constructed as herein described, for holding the rake and frame from the ground.

In testimony whereof I have signed my name to this specification before two subscribing witnesses.

CHAS. S. HUNTINGTON.

Witnesses:
  ROBERT HITCHCOCK,
  NELSON H. PIERCE.